United States Patent [19]

Hopp et al.

[11] Patent Number: 4,542,572
[45] Date of Patent: Sep. 24, 1985

[54] DEVICE FOR THE ACCURATE POSITIONING OF THE LWL FIBER ENDS OF LWL COMPONENTS

[75] Inventors: Werner Hopp; Bertold Marlorny, both of Berlin, Fed. Rep. of Germany

[73] Assignee: Siemens Aktiengesellschaft, Munich, Fed. Rep. of Germany

[21] Appl. No.: 556,134

[22] Filed: Nov. 29, 1983

[30] Foreign Application Priority Data

Nov. 30, 1982 [DE] Fed. Rep. of Germany ....... 3244689

[51] Int. Cl.⁴ ............................................... B23Q 3/02
[52] U.S. Cl. ..................... 29/281.5; 269/43; 269/87; 269/91; 269/303; 269/903
[58] Field of Search ..................... 269/91–94, 269/303, 305, 315, 257, 903, 909, 24, 43, 87; 29/281.1, 281.5

[56] References Cited

U.S. PATENT DOCUMENTS

| | | | |
|---|---|---|---|
| 1,900,314 | 3/1933 | Strom | 269/257 |
| 3,382,742 | 5/1968 | Gibbs | 269/91 |
| 3,704,880 | 12/1972 | Gudel | 269/303 |
| 4,045,010 | 8/1977 | Arnold | 269/315 |
| 4,327,786 | 5/1982 | Markkula | 269/303 |
| 4,477,063 | 10/1984 | Mehier | 269/93 |

Primary Examiner—Robert C. Watson
Attorney, Agent, or Firm—Kenyon & Kenyon

[57] ABSTRACT

A device for the accurate positioning of the LWL fiber ends of LWL components, particularly of LWL switches and plug connectors in which a support surface is provided with a guide slot arranged at right angles to the surface for receiving the support part of LWL fiber ends. The accurate positioning of the LWL fiber ends takes place by means of a sliding part which presses the LWL fiber ends by spring force against the support surface of the device and the boundary surface of the support part. The lengthwise positioning is made possible by contact of the fiber end faces against the stop surface of a spacer. Such devices are useful for the manufacture of LWL components, particularly of LWL switches and plug connectors in telephone engineering.

2 Claims, 4 Drawing Figures

DEVICE FOR THE ACCURATE POSITIONING OF THE LWL FIBER ENDS OF LWL COMPONENTS

BACKGROUND OF THE INVENTION

This invention relates to devices for the accurate positioning of the LWL (optical waveguide) fiber ends of LWL components in general and more particularly to such devices for use in positioning switches and plug connectors.

Devices for accurate positioning of LWL fiber ends are realized in principle either by the employment and use of parts which are complicated and are very expensive to produce in view of the accuracy of the contours, or by fixtures, the design of which is less expensive but with which cost-intensive readjustment of the fiber ends relative to corresponding reference contours of the corresponding fixtures is necessary.

The problem, on which the present invention is based consists of manufacturing, on the one hand, such a device itself with parts of simple design and on the other hand, reducing the effort for adjusting the LWL fiber ends with respect to their mutual alignment and also to the device itself to a minimum.

SUMMARY OF THE INVENTION

According to the present invention this problem is solved by:
(a) providing the device with a plane support surface with a guide slot extending at right angles thereto for receiving a support part containing the LWL fiber ends;
(b) designing the guide slot in such a manner that the LWL fiber ends are positioned against the support surface parallel to the longitudinal direction of the guide slot and against a boundary surface of the support part adjoining at right angles thereto with plane parallel pressure exerted by means of a sliding part functionally ready for operation;
(c) positioning the LWL fiber ends in the region of the fiber end faces in plane parallel relationship to each other using the stop surface of a spacer;
(d) providing the sliding part in the region of the contact surface against the LWL fiber ends with a chamfer which makes an angle of approximately 45° relative to the contact surface; and
(e) providing the sliding part in the central region of the side facing the support part with a recess for applying adhesive to the LWL fiber ends and to the boundary surface of the support part.

With the guide slot extending at right angles to the plane contact surface for receiving the support part, the position of the LWL fiber ends is fixed in a simple manner by the slot depth on the support part of the corresponding LWL component. The depth and width of the slot are designed so that each support part is received free of adjustment at a right angle to the plane support surface of the device, and the LWL fiber ends can be pushed against the respective support part in the position required for the respective LWL component by means of the chamfered surface of the sliding part. For lengthwise positioning, the LWL fiber ends are pushed so as to be plane parallel against the contact surface of the spacer in the region of their fiber end faces and subsequently the LWL fiber ends are connected nondetachably to the corresponding support part of the LWL component by application of an adhesive. For the unimpeded application of the adhesive, the sliding part is provided with a recess. The chambered surface of the sliding part which makes an angle of approximately 45° relative to the contact surface of the device assures displacement-free pressure of the LWL fiber ends against the respective support part of the LWL component.

According to one advantageous embodiment of the present invention, the sliding part is designed so that the surfaces of the sliding part facing the contact surface and the boundary surface of the support part form an angle smaller than 90° and the sliding part is subjected to the action of a spring in such a manner that the sliding part, after being detached from a rest position determined by a detent position, has a chamfered end which presses the LWL fiber ends against the contact surface and boundary surface along a line approximately at an angle of 45° to the contact surface and the boundary surface of the support part. It is assured thereby that the sliding part, in the state of contact with the LWL fiber ends, does not come into frictional connection with the support part of the LWL component. As a result, the accurate positioning of the LWL fiber ends is not changed and damage thereto is avoided by possible canting or unilateral pressure on the LWL fiber ends. Through the action of the spring, the sliding part is always pushed toward the contact surface of the device and the boundary surface of the support part with constant pressure, so that the LWL fiber ends are accurately positioned on the support part without adjusting operations.

DETAILED DESCRIPTION

Figure 1:
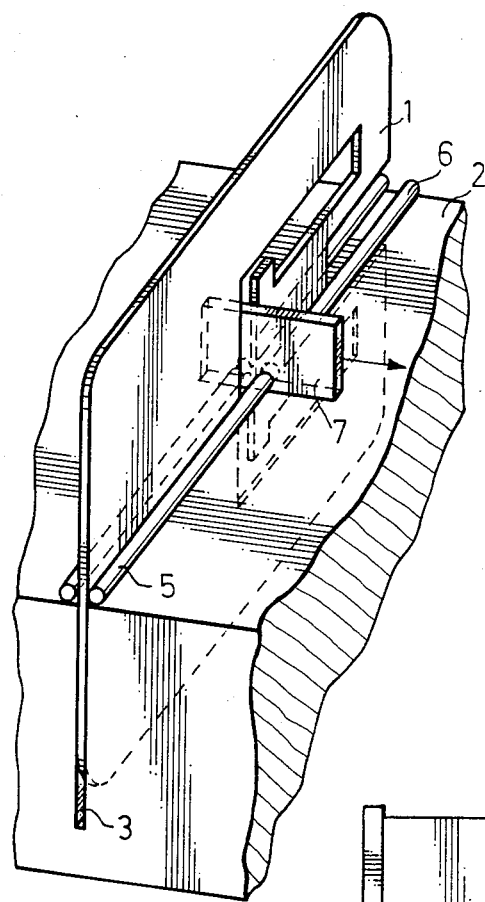
FIG. 1 is a perspective view showing part of an LWL switch with a support part.

In FIG. 1, the support part 1 of an LWL switch is shown. Support part 1 receives LWL fiber ends 5 and 6 which must be accurately positioned thereon. The device for the accurate positioning of the LWL fiber ends on support part 1 has a plane contact surface 2 into which is formed a guide slot 3, which extends at right angles to this contact surface 2, for receiving support part 1 containing the LWL fiber ends 5 and 6. In order to obtain the exact spacing of the fiber end faces of the LWL fiber ends 5 and 6, a spacer 7 is inserted on the plane support surface 2 of the device in the direction of the arrow by means of a guide, not shown. The dimensions of the guide slot 3 are designed so that the support part 1 of the LWL component is fixed in an accurate position at right angles to the plane support surface 2.

Figure 2A:
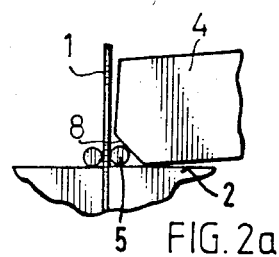
FIGS. 2 and 2a are views further illustrating the device for accurately positioning the LWL fiber ends in detail.
Figure 2:
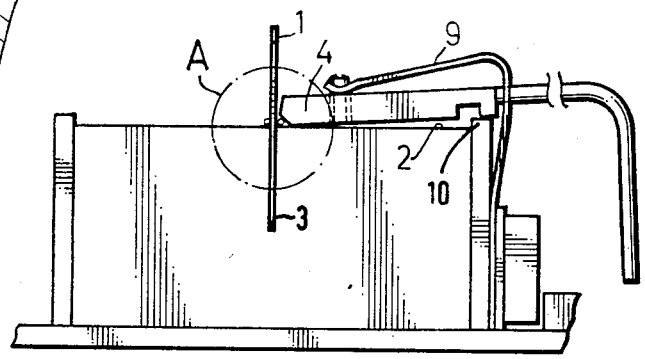

FIGS. 2 and 2a shown schematically in more detail a device for accurately positioning the LWL fiber ends on the support part 1 of an LWL component. Here also, the guide slot 3 is at a right angle to the plane support surface 2 of the device. The support part 1 is inserted into slot 3. Furthermore, a sliding part 4 is shown in its operating position, having been released from a detent 10, under the action of a spring 9. For a better understanding, an enlarged view of the detail at A is shown in FIG. 2a. This shows that the sliding part 4 is designed so that the surfaces of the sliding part 4 which face the support surface 2 and the boundary surface of the support part 1 of FIG. 2 form an angle of less than 90°. It will furthermore be seen that a chamfered surface 8 of the sliding part 4 is open relative to the support surface 2, approximately at an angle of 45° to support surface 2 pressing the LWL fibers against the support surface 2 and the boundary surface of the support part 1. In the condition where the LWL fiber 5 is pressed against the surfaces, the sliding part 4 does not come into frictionally locked connection with the support part 1, so that canting of the sliding part 4 and thereby, a change of the accurate positioning of the LWL fiber ends is made impossible.

Figure 3:
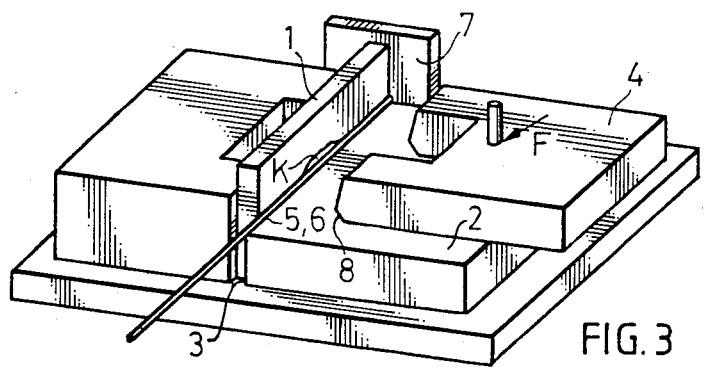
FIG. 3 is a perspective view of a device for the accurate positioning of the LWL fiber ends of an LWL plug connector.

FIG. 3 is a perspective view of a device for the accurate positioning of the LWL fiber ends of an LWL plug connector. Here, too, two parts of very simple design, not designated, form the guide slot 3 into which the support part 1 of the LWL plug connector is inserted. The position of the LWL fiber ends 5 and 6 is fixed on the support part 1 by the plane support surface 2. The sliding part 4 is under the action of the spring force F in the same manner as already described in connection with FIG. 2; this spring force pushes the sliding part 4 with its chamfered surface 8 against the LWL fiber ends 5 or 6 against the boundary surface of the support part 1. The stop surface of the spacer 7 is provided for the lengthwise positioning of the LWL fiber ends. In its central zone, the sliding part 4 has a recess, not designated, which, with the sliding part 4 in its pressing condition permits the application of adhesive K to the LWL fiber ends 5 and 6 to bond them to the boundary surface of the support part 1.

What is claimed:

1. A device for the accurate positioning and securing of the LWL fiber ends of LWL components on a support part, particularly of LWL switches and plug connectors, comprising:
   (a) a plane support surface with a guide slot extending at right angles thereto for receiving the support part on which the LWL fiber ends are to be secured;
   (b) a sliding part a having contact surface for exerting pressure to the LWL fiber ends to push them against the support part, the guide slot located such that the LWL fiber ends are positioned against the plane support surface parallel to the longitudinal direction of the guide slot and against a boundary surface of the support part adjoining at right angles thereto with plane parallel pressure, functionally ready for operation;
   (c) a spacer having a stop surface for positioning the LWL fiber ends in the region of the fiber end faces in plane parallel relationship to each other;
   (d) the sliding part, in the region of the contact surface, having a chamfer which makes an angle of approximately 45° relative to the plane support surface;
   (e) a recess in the central region of the side of the sliding part, facing the support part, for applying adhesive to the LWL fiber ends and to the boundary surface of the support part; and
   (f) means biasing said sliding part against said LWL fiber ends with a biasing force acting essentially perpendicular to said contact surface.

2. A device according to claim 1, and further comprising:
   (a) the sliding part being designed so that the surfaces of the sliding part facing the support surface and the boundary surface of the support part form an angle smaller than 90°;
   (b) a detent extending from said plane support surface and a recess in said sliding part for engaging said detent, said sliding part contact surface spaced from said LWL fiber ends when said recess is engaged in said detent; and
   (c) said means biasing, comprising a spring acting on the sliding part in such a manner that the sliding part, after it is released from a rest position predetermined by said detent, presses the LWL fiber ends with its chamfered end linearly against the support surface and the boundary surface of the support part approximately at an angle of 45° to the support surface.

* * * * *